No. 691,562. Patented Jan. 21, 1902.
J. MUELLER.
TOOL HANDLE.
(Application filed June 6, 1901.)
(No Model.)
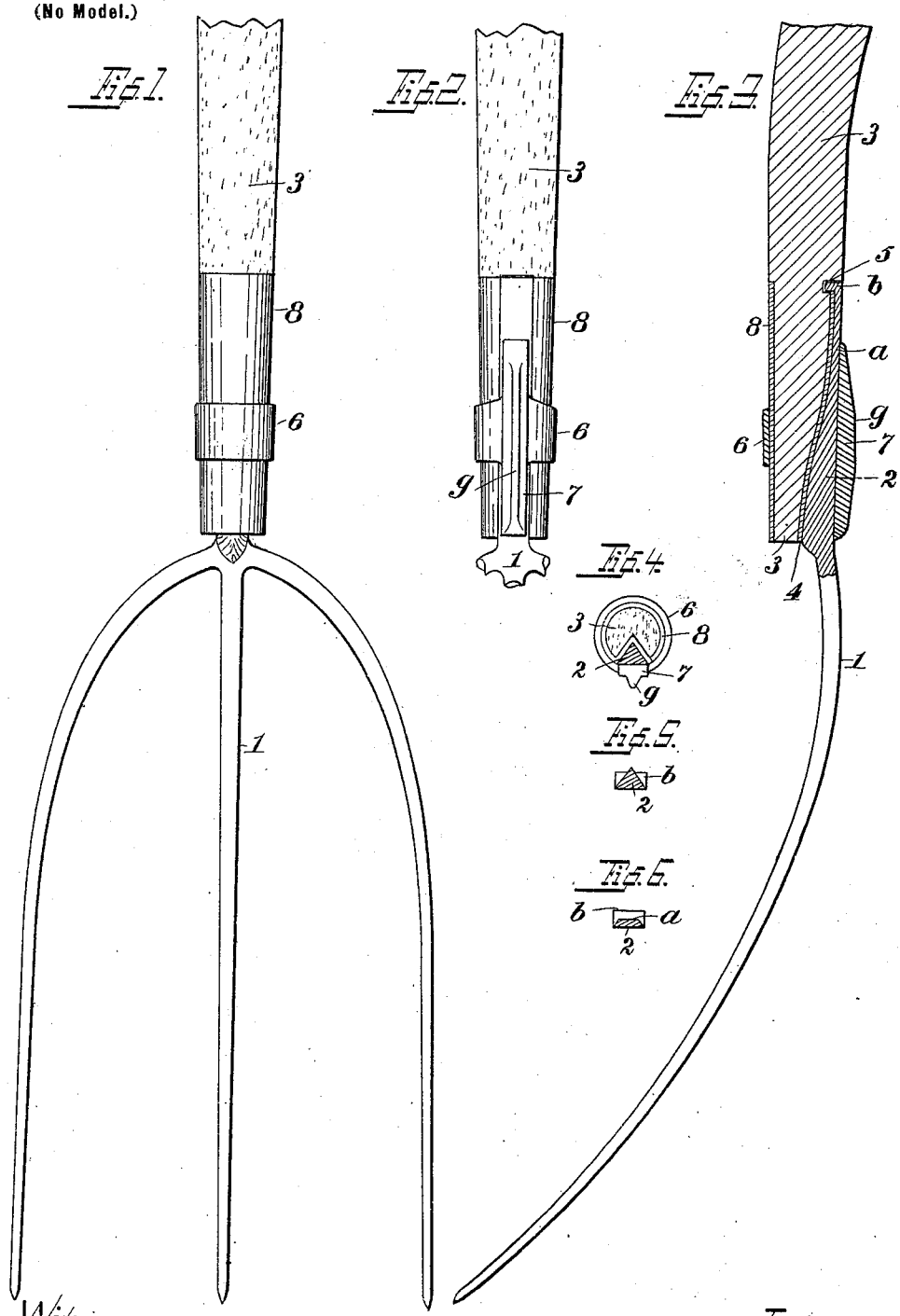

UNITED STATES PATENT OFFICE.

JOHN MUELLER, OF LISBON, NORTH DAKOTA.

TOOL-HANDLE.

SPECIFICATION forming part of Letters Patent No. 691,562, dated January 21, 1902.

Application filed June 6, 1901. Serial No. 63,349. (No model.)

*To all whom it may concern:*

Be it known that I, JOHN MUELLER, a citizen of the United States, residing at Lisbon, county of Ransom, and State of North Dakota, have invented new and useful Improvements in Tool-Handles, of which the following is a specification.

My invention relates to improvements in tool-handles, and pertains especially to the means for securing the handles to the implements, the invention being designed principally for use in connection with hay-forks and other agricultural implements. Devices of this class have heretofore been constructed with a tapering conical ferrule formed to inclose the shank of the implement and one end of the handle with rivets, hooks, or other means of similar character to prevent the shank from slipping out longitudinally. Nearly all of these fastenings are permanent in character; but in some instances it has been attempted to employ a removable thimble formed to inclose the ferrule and bind the shank in position. Great difficulty has been experienced, especially where the shanks are made removable, in securing the parts rigidly together, a very slight or imperceptible movement of the fork or other implement in the handle being sufficient to cause it to work loose. Where thimbles are employed to hold the parts together, it is difficult to get them to fit the contour of the ferrule exactly, and unless these metal surfaces are in actual contact throughout they become easily separated when in use.

The object of my invention is to provide a form of fastening in which a comparatively short ring or thimble is provided with a wedge-bar of much greater relative length, the bar being adapted when the parts are in position to engage directly against the shank of the fork or other implement, whereby the shank is not only supported by the bar, but the pressure of the long wedge-bar is concentrated in the comparatively short thimble, which is thus made to engage the ferrule with great force, so that no movement whatever is possible unless the wedge is first driven downwardly toward the end of the handle. The comparatively short ring also facilitates the removal of the shank, as it is free to tilt when loosened.

In the following description reference is had to the accompanying drawings, in which—

Figure 1 is a front view of a fork and a portion of its handle embodying my invention. Fig. 2 is a rear view of the same with the tines of the fork broken away. Fig. 3 is a central longitudinal sectional view. Fig. 4 is a cross-sectional view drawn through the lower end of the handle and shank. Fig. 5 is a cross-sectional view of the shank near its lower end. Fig. 6 is a cross-sectional view of the same near its upper end.

Like parts are identified by the same reference characters throughout the several views.

In the drawings the fork 1 is shown with a tapered shank 2, which is triangular in cross-section and flattened at $a$, and near the smaller or free end with a hook or catch $b$, adapted to engage in a suitable recess in the handle, as hereinafter described. The handle 3 is tapered at its lower end in the usual manner and is provided with a groove 4, V-shaped at its lower end and extending in a shallow channel at its upper end, which terminates in a notch or recess 5, as best shown in Figs. 3 and 4. The tapered end of the handle is provided with a metallic sheath or ferrule 8, which conforms to the contour of the inclosed portion of the handle and the groove 4 therein. This ferrule may extend upwardly along the handle to any desired distance as an inclosing sheath or in any other desired form. The shank 2 of the fork is adapted to fit in the groove 4, with the catch $b$ engaging in the notch 5 and the outer surface of the shank substantially flush with the handle. To secure the shank in position, I have provided a thimble 6, to which a wedge-bar 7 is integrally secured in a position to coincide with the shank 2 when the thimble is adjusted to the handle, as shown. By driving the wedge-bar and thimble upwardly on the tapered end of the handle the parts will be securely bound together, while by driving them in the opposite direction the parts will be loosened, and the shank and fork may then be readily removed from the handle by tilting the fork until the catch $b$ disengages from the notch.

$g$ is a strengthening-rib on the exterior surface of the wedge-bar.

While I have shown and described my invention as applied to a fork, it will be understood that the same may be used for securing any implement to a handle, and I therefore claim the same broadly, irrespective of the particular implement in which it is embodied.

What I claim as new, and desire to secure by Letters Patent, is—

1. The combination with a handle having a tapered end grooved and notched for the reception of the shank of a fork, or other implement; a shank adapted to fit said groove, and provided with a catch adapted to engage in said notch; and a thimble adapted to fit the tapered end of the handle, and provided with a bar adapted to register and engage with a wedging pressure upon the exposed surface of the shank, whereby the parts may be securely bound together.

2. The combination with a handle; of a shank adapted to be adjusted thereto; and a thimble provided with a wedge-bar adapted to forcibly engage the shank and bind the latter rigidly to the handle.

3. The combination with a handle having a notch; of a shank adapted to be adjusted thereto, and provided with a catch adapted to engage in a notch in the handle; a thimble provided with a wedge-bar, adapted to forcibly engage the shank and bind the latter rigidly to the handle.

4. The combination with a handle; of a ferrule adapted to be adjusted thereto, and provided with a groove in one side and a notch therein; a shank adapted to fit the groove, and having a catch engaging in said notch; a thimble adapted to fit said ferrule, and provided with a wedge-bar, located for longitudinal engagement with the shank.

5. The combination of a handle, provided with a tapered ferrule having a V-shaped channel extending inwardly from one end, and terminating in a shallow groove, together with a notch of greater depth than the groove; a shank formed to fit the channel and groove, and provided with a catch adapted to engage in said notch; a thimble adapted to be adjusted to the tapered end of the ferrule, and provided with a wedge-bar arranged for forcible longitudinal engagement with the shank.

6. The combination with a handle, having a tapered end and a groove in one side of the tapered portion; a notched ferrule inclosing the end of the handle and conforming substantially to the contour of the groove; a shank formed to fit the groove and provided with a catch adapted to engage in a notch in the ferrule; and a thimble adapted to fit said ferrule and provided with a wedge-bar, adapted to engage the exposed surface of the shank.

In testimony whereof I affix my signature in the presence of two witnesses.

JOHN MUELLER.

Witnesses:
GILBERT LA DU,
CHAS. A. GRAM.